Feb. 27, 1968 C. J. MOLE 3,370,434

THERMOELECTRIC HEAT EXCHANGER

Filed Dec. 1, 1966 4 Sheets-Sheet 1

WITNESSES

Theodore F. Wrobel

Lee P. Johns

INVENTOR

Cecil J. Mole

BY Frederick Shapoe

ATTORNEY

Feb. 27, 1968 C. J. MOLE 3,370,434

THERMOELECTRIC HEAT EXCHANGER

Filed Dec. 1, 1966 4 Sheets-Sheet 2

3,370,434

THERMOELECTRIC HEAT EXCHANGER

Cecil J. Mole, Murrysville, Pa., assignor to Westinghouse Electric Corporation, Pittsburgh, Pa., a corporation of Pennsylvania Filed Dec. 1, 1966, Ser. No. 598,461
11 Claims. (Cl. 62—3)

This invention relates to thermoelectric apparatus having a varying pellet size along the coolant flow path.

The provision of thermoelectric devices for certain applications requires the construction of a thermopile arrangement of compact size, lightweight, shockproof construction. In such thermoelectric devices where one of two fluid media is a liquid and the other is a gas, it is desirable to isolate completely the flow passageways for one of the media from the other medium, particularly where one of the passageways includes a number of soldered or brazed joints. In such devices, the thermoelectric pellets are secured to electrically conductive members by a number of soldered or brazed joints. It is important that all of the soldered or brazed joints are not subject to corrosion due to moisture present in the other medium.

Associated with the foregoing is a direct relationship between the pellet size and the temperature drop across the pellet. In a system where large fluid temperature gradients are present, it is beneficial to take advantage of the optimum ratio of pellet area to pellet length ($A/L$) for the local temperature conditions and have more than one pellet configuration. As a result, there is a more economic use of thermoelectric material, whereby there results a smaller system, higher efficiency, and lower cost.

In accordance with the invention it has been found that for optimum operations and maximized coefficient of performance the ratio of area to length of a pellet should decrease with an increase in the temperature difference ($\Delta t_D$), through the pellet.

Accordingly, it is a general object of this invention to provide a thermoelectric cooling device in which the parameters of the thermoelectric pellets are adjusted in relation to the pellet temperature difference along the path of fluid flow of the cooled medium.

It is another object of this invention to provide the thermoelectric cooling device in which the ratio of the area to length of the thermoelectric pellets is decreased along the path of flow of the cooled medium as the temperature difference across the pellet increases.

It is another object of this invention to provide a thermoelectric device in which the cooled medium is cooled with greater efficiency.

Finally, it is an object of this invention to satisfy the foregoing objects and desiderata in a simple and effective manner.

Briefly, the device of the present invention accomplishes the foregoing objects by providing a fluid-to-fluid thermoelectric construction or thermopile wherein a liquid flow circuit is formed by a plurality of spaced blocked members having flow openings formed therein, and tubular connectors between the openings of each pair of spaced block members and being composed of a material having a relatively high electrical resistance. Each of the block members is fixedly disposed relative to one another and the connectors are formed to expand and contract, thereby absorbing stresses induced upon the connectors due to relative motion of block members caused by thermal expansion of contraction thereof. A pair of retaining grids or frames are provided for holding the block members fixedly in place. The grids are formed so that each of the gaseous heat exchange means of the thermopile protrudes therethrough. Each of the block members is enclosed by the grid structures while the gaseous heat exchange means are disposed outwardly of the grid structures. Suitable shock absorbing means, such as resilient gasketing means, are mounted between the grid structure and adjacent heat exchange portions of the thermopile to absorb shock imparted to the thermopile by external forces without causing damage to any of the thermopile parts. The gasketing means also isolate the block members and the connectors mounted therebetween from any moisture carried by the medium flowing past the gaseous heat exchange means. The connectors are secured to adjacent block members by brazed or soldered joints which are isolated from adverse effects of moisture. The grid structure is formed of a generally open construction permitting the projection therethrough of heat exchange fins or the gaseous heat exchange means to provide a relatively lightweight construction. The grid structure also provides guide means thereon for the flow of gas through the gaseous heat exchange means.

Moreover, a plurality of generally parallel extending rows of heat conductive blocks are provided with a current flow path formed in each row to extend longitudinally therealong in a serpentine manner. Means are provided for connecting the serpentine current flow paths of each row in series comprising the end ones of the gaseous heat exchange structures which are mounted in bridging relationship across adjacent rows.

Each of the block members is provided with a flow opening therein with the block members in each row having the flow openings thereof connected in series by a plurality of high resistance, flexible connectors. Means are provided for connecting each row of flow openings in series comprising specially formed end block members disposed at the ends of the rows and flexible connectors coupling the flow passageways of each end block and simultaneously retaining the hermetic integrity of the liquid flow path.

Finally, the block members are disposed in successive stages extending from the incoming end of the flow path of the gas to be cooled to the outgoing end thereof, the parameters of each stage relating to the area and length of the block member being related in an area to length ratio which ratio reduces from the incoming end to the outgoing end of the gaseous flow path.

For a better understanding of the invention, reference may be had to the accompanying drawings, in which:

FIGURES 1A and 1B when disposed in alignment in accordance with the dot-dash lines thereof comprises an exploded view of a thermoelectric structure embodying the principles of prior art construction;

Figure 1A:
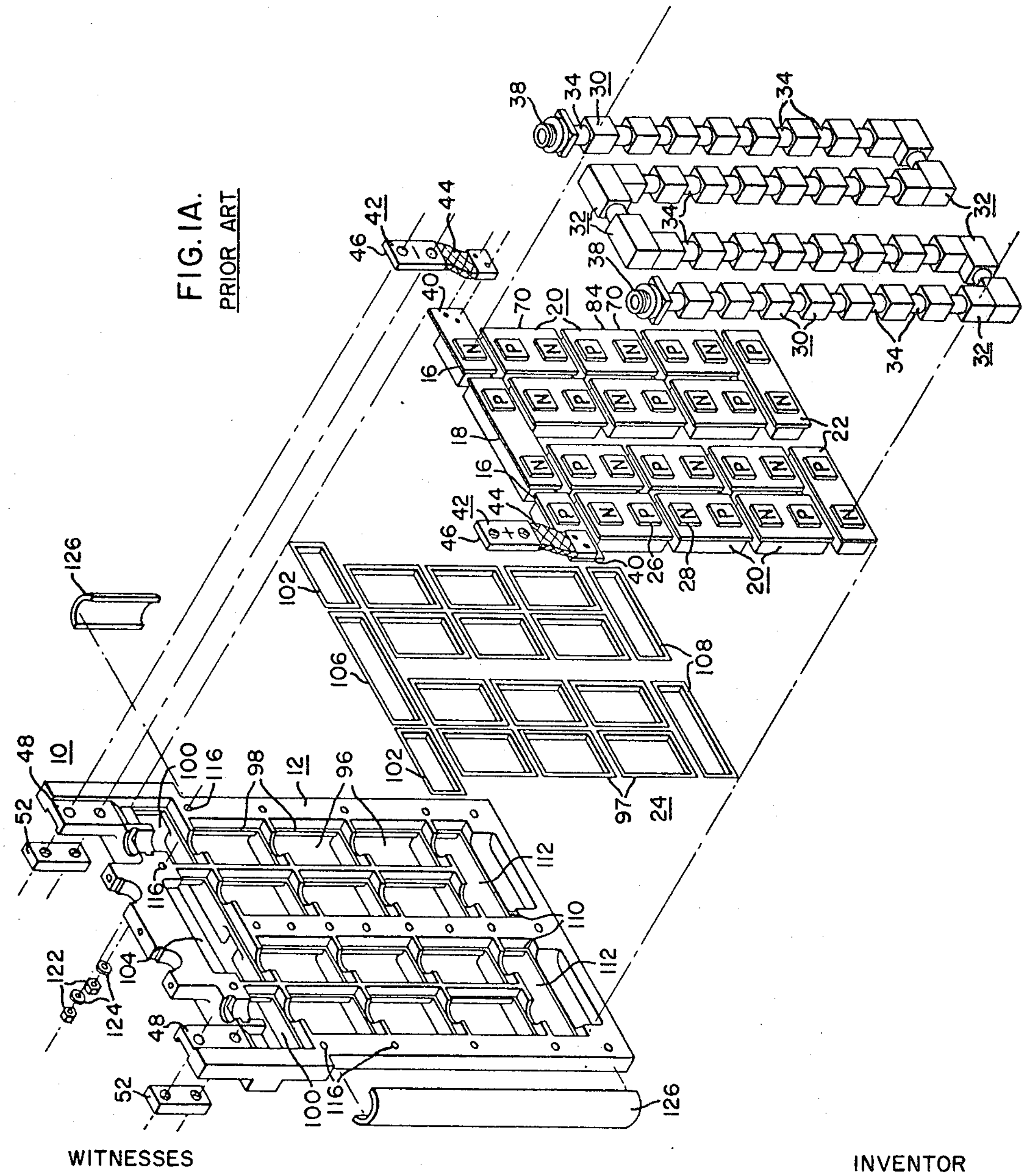
FIG. 1A. PRIOR ART
Figure 1B:
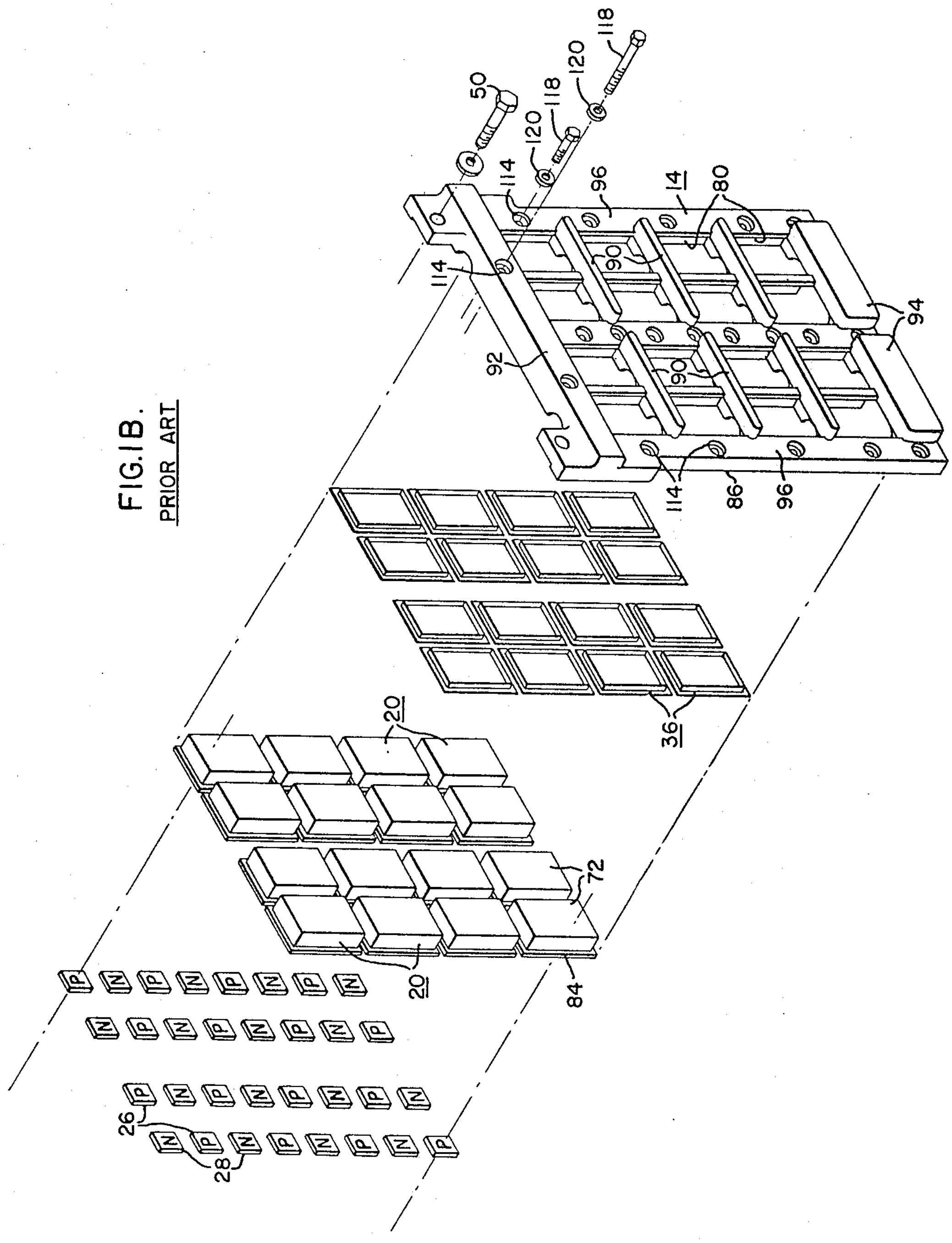
FIG. 1B. PRIOR ART

Referring to the drawings, it will be appreciated from the exploded views of FIGS. 1A and 1B that a thermopile 10 constructed in accordance with the principles of this invention includes lower and upper retaining grid structures 12 and 14 respectively formed of a generally open construction from suitable materials such as polyester glass or from molded resinous materials. Fitted within openings in the lower grid structure 12 are a plurality of differently sized heat exchange structures designated by the reference characters 16, 18, 20 and 22 which extend through the complementary openings, as will be hereinafter more fully explained. To provide a shockproof mounting for the thermopile 10, a plurality of differently sized annular gasket means 24 are interposed between the heat exchange structures 16, 18, 20, and 22 and the peripheries of the openings in the lower grid 12 with each gasket means 24 being shaped to conform to the corresponding peripheral shapes of the grid openings and heat exchange structures. A lower group of spaced pellets 26 and 28 of thermoelectric material are positioned in a plurality of coplanar rows and are secured to the heat exchange structures 16, 18, 20 and 22 in a predetermined array. The pellets 26 and 28 are secured to the heat exchange structure by suitable means such as by a soldered joint, made at a relatively low temperature, or by brazing. The reference character 26 designates a thermoelectric pellet of thermoelectrically positive material, and pellets of thermoelectrically negative material are designated by the reference character 28. A plurality of coplanar rows of block members or modules 30 formed from electrically and thermally conductive material are secured to the thermoelectric pellets 26 and 28 by suitable means, such as by soldering or brazing. In each row, certain of the end block members or modules 32 are generally L-shaped and serve to joint flow passageways of adjacent rows of blocks in series in a manner to be described.

Each of the block members 30 and 32 desirably is provided with a flow passageway 58 (FIG. 3) for providing a flow path for a liquid heat exchange medium. The passageways in each block 30 and 32 of each row is connected in series by coupling members 34 illustrated herein as bellows. Each bellows 34 is formed from a material having a high electrical resistance and shaped to absorb relative motion of adjacent blocks 30 and 32. An upper group of heat exchange structures conforming in size and shape to the heat exchange structure 20 and designated by the same reference character are secured in bridging relationship across adjacent ones of coplanar rows of thermoelectric pellets 26 and 28 forming an upper group or layer of pellets. The upper grid structure 14 receives the upper layer of heat exchange structures 20 in complementarily shaped openings therein. Interposed between the peripheries of the upper group of heat exchange structures 20 and the upper grid structure 14 are gasketing means 36 formed to promote a shockproof mounting of the thermopile 10. The gasketing means serves where necessary, as insulating means between the thermopile 10 and the grid 14, in the event the grid 14 is formed from an electrically conductive material. A pair of fluid connectors 38 are coupled to the upper left-hand block members 30 and the upper right-hand block member 30 (as viewed in FIG. 1A) by suitable means such as by high resistance connectors or bellows 34 for the purpose of connecting the fluid passageway of the thermopile 10 to suitably supply and exhaust conduits (not shown) for transporting liquid to the thermopile 10.

Each of the upper left-hand and upper right-hand heat exchange structures 16 (FIG. 1A) of the lower group of heat exchange structures is provided with a sidewardly extending base or plate 40 thereon to which an electrically conducting terminal 42 is secured by a suitable means such as by mounting bolts. The terminal structures 42 each includes a conductive flexible strap 44 thereon formed desirably from braided conductive material and a terminal plate 46. Each terminal plate 46 is received on an upwardly extending, integrally formed surface 48 disposed on the lower grid structure 12 and fixedly positioned in engagment with the surfaces 48 by suitable means such as by mounting bolts 50 which extend through aligned openings in terminal plate 46, surface 48 and threaded retainers 52.

The electrical flow path through the thermopile extends from the positive terminal 42 (located to the left of FIG. 1A) to the adjacent base 40 of the heat exchange structure 16, through the thermopile 10 to the negative terminal 42 (located at the right in FIG. 1A).

Figure 3:
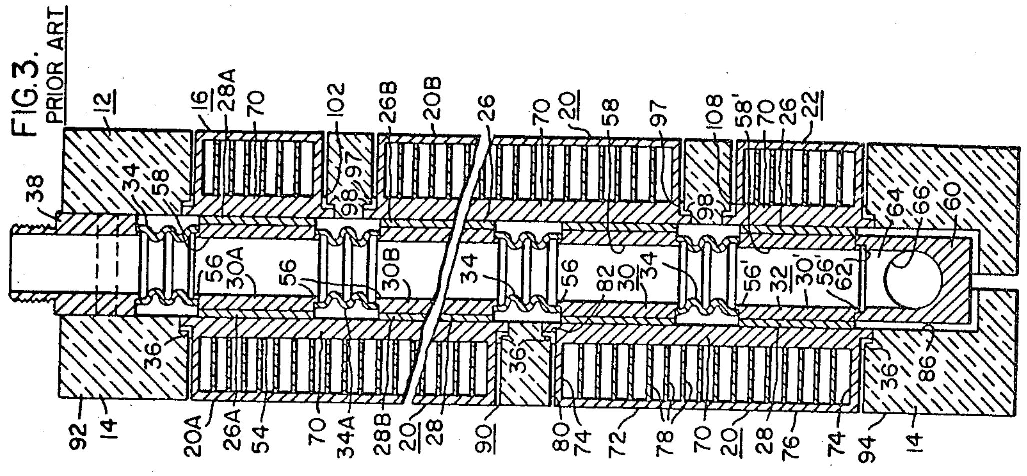
FIG. 3. PRIOR ART
FIG. 3 is an enlarged sectional view of the thermoelectric construction of FIGS. 1A and 1B, and of FIG. 2 taken substantially along the lines III—III of FIG. 2.

More specifically (viewing FIGS. 1A and 1B) from plate 40 of left-hand heat exchange structure 16, current passes through the thermoelectric layer 26 secured to heat exchanger 16, through the upper left-hand block 30 in the extreme left-hand row of blocks to the upper left-hand pellet 28 in the extreme left-hand row of pellets and therefrom to the upper left-hand heat exchanger 20 in the upper group of heat exchangers. Each heat exchanger 20 in the upper group is connected in bridging relationship to two adjacent thermoelectric pellets in the corresponding vertical row of thermoelectric pellets. Similarly the heat exchangers 20 of the lower group of heat exchangers are connected in bridging relationship with two adjacent thermoelectric pellets, as shown in FIG. 1A, with the heat exchanger 20 of the upper and lower groups bridging such pellets 26 and 28 in an alternating manner (as shown in FIG. 3) to provide a serpentine current flow path through each heat exchanger 20, thermoelectric pellets 26 and 28 and through each block member 30. The heat exchangers 22 serve to bridge electrically the lower thermoelectric pellets of the extreme left and center left rows of pellets and the lower pellets of the center right and extreme right rows. The heat exchanger 18 bridges the upper ones of the thermoelectric pellets in the center left and center right rows so that each of a series current flow path through each thermoelectric pellet results.

As FIG. 3 is a section view through the extreme left row of blocks 30 of FIG. 1, the following description of the current flow path will be made in terms of electron flow rather than conventional current flow through thermopile 10. It will be seen from FIG. 3 that the electrical flow path (in terms of electron flow) passes from heat exchanger 16 through the adjacent thermoelectric layer 28A and then transversely through the electrically conducting block member 30A to thermoelectric layer 26A. From the thermoelectric layer 26A, the electron flow passes to the base section 54 of the heat exchange structure 20A with the base 54 being mounted in bridging relationship across the thermoelectric layer 26A and coplanar thermoelectric layer 28B. From the thermoelectric layer 28B, the electron flow path extends through the block or module 30B and therefrom through the thermoelectric layer 26B heat exchange structure 20B and therefrom in a serpentine manner through each of the thermoelectric layers, heat exchange structures and modules 30 to the left-hand terminal structure 42 of FIG. 1A. Inasmuch as each of the connectors 34 desirably is formed of a high resistance material when compared with the resistance along the aforedescribed current flow path, only small portions of the total electrical current bypasses the modules 30A and 30B along the path from the modules 30A through the connector 34A to the module 30B.

As will be appreciated by those skilled in the art, each of the connectors or bellows 34 desirably is formed from a material which is compatible metallurgically with the material forming the modules 30. More particularly each of the modules 30 is provided with a pair of flanges 56 extending outwardly from the ends thereof and disposed circumferentially of the flow openings 58 in the modules 30. The connectors 34 desirably are sized to closely receive therein the circumferential flanges 56 and a suitable hermetic joint is formed between the flanges 56 and the connectors 34 by means well known in the art such as by brazing or soldering.

It must be realized that by "high electrical resistance" it is meant that the total resistance of the coupling members of this invention such as the bellows 34 desirably is of such a magnitude that the flow of current across the bellows is less than 5% and in most instances is no more than 1 or 2% of the total current flow through the thermopile 10. The specific composition of material forming such coupling members is chosen from the group of relatively high resistance material which materials are sufficiently compatible with the material forming the modules 30 and 32 to permit a good hermetic joint to be formed therebetween. In choosing of material for the bellows 34, it is to be realized that the electrical resistivity of the material must be considered. However, it is to be further realized that it is the total resistance across the bellows which determines its suitability for use with the thermopile 10. The total resistance across the bellows is directly proportional to the length of the bellows and inversely proportional to the cross-sectional area of the material forming the bellows. The corrugated form of the bellows serves to increase the effective length and, therefore, the resistance thereacross. In addition, each bellows is formed from relatively thin material, thereby reducing its cross-sectional area to increase further the total resistance of the bellows.

Viewing FIGS. 1A and 1B, it will be appreciated that the group of block member modules in the left-hand row are connected together electrically by the upper and lower groups of heat exchange structures with the heat exchange structures being secured respectively in bridging relationship across adjacent block members in an alternating manner to produce the serpentine electrical current flow path. Two L-shaped block members 32 are mounted in juxtaposed relationship at the lower ends of the extreme left and center left rows of block members of FIG. 1A, and the left-hand heat exchange structure 22 is mounted in bridging relationship across the last-mentioned block members 32 to connect electrically the current flow path of the extreme left row to the current flow path of the center left row. Similarly, at the upper end of the center left row and center right row there are provided a second pair of juxtaposed L-shaped block members 32 which are connected in bridging relationship by the heat exchange structure 18 and associated thermoelectric pellets to couple the last-mentioned block members 32 together electrically, thereby connecting the electrical flow path over the center left row to the electrical flow path of the center right row. At the lower end of the center right-hand row of FIG. 1A and of the extreme right-hand row thereof, a third pair of juxtaposed L-shaped block members 32 are provided and the electrical flow paths of each of the last-mentioned rows are connected in series by the right-hand heat exchange structure 22 and the thermoelectric layers associated therewith.

As has been pointed out, in each of the rows intermediate the extremities thereof, the heat exchange structures 20 are secured in bridging relationship across adjacent block members in an alternating manner, as illustrated specifically in FIG. 3. As a result an electrical flow path is provided between each of the terminals 42 which passes through each of the thermoelectric layers 26 and 28, each of the heat exchange structures 16 and 18, 20 and 22, each of the modules or block members 30 and 32 to effect thermoelectric heating or cooling in the heat exchange structures and in the block members 30 and 32.

As seen in FIG. 1A, a series liquid flow path is formed through each of the block members 30 and 32 by means of the connectors or bellows 34. Each of the block members 30 includes the central opening 58 (FIG. 3) extending longitudinally therethrough with adjacent openings 58 being connected in series by bellows 34 secured to adjacent block members 30 in the manner heretofore described.

Each of the L-shaped block members 32, in this example of the invention, is provided with a generally L-shaped opening therethrough with the block members 32 being formed from a separate pair of heat conductive block members 30' and 60 having the openings formed in each one of the block members prior to final assembly thereof. More specifically (viewing FIG. 3) the lower block member 32 includes as the upstanding portion a block 30' which is formed exactly as the blocks 30 of the thermopile 10. The block members 30' includes the central opening 58' formed therein and the circumferential shoulders 56' extending outwardly from the opposed ends of the block members 30' with the upper shoulder being hermetically secured to the adjacent bellows 34. The lower or base portion 60 of the block members 32 is provided at its upper end with a circular shallow recess 62 formed therein which receives the adjacent shoulder 56' of the block members 30' therein. An opening 64 extends downwardly from the lower surface of the recess 62 to a position substantially centrally of the lower block 60 and a transverse opening 66 extends longitudinally through a substantial portion of the base 60 with the opening 66 extending horizontally (FIG. 3) and communicating with the vertical passageway 64. The pieces 30' and 60 of each module and block members 32 are secured together hermetically at positions adjacent the flange 56' and recess 62 by suitable means such as by brazing or soldering.

Each of the base members 60 is provided with a shoulder (not shown) similar to the shoulders 56 and 56' to which the adjacent bellows structure 34 may be secured for the purpose of connecting the flow opening of one of the block members 32 to the corresponding flow opening in a juxtaposed block member 32. In this manner each of the flow openings 58' and 64 and 66 of each of the rows are connected in series with the upper left-hand flow opening 56 of the extreme left row being connected to a connector 38 and the corresponding block members 30 of the extreme right-hand row being coupled to another connector 38 by similar bellows structures 34, as illustrated in detail in FIG. 3.

As illustrated in FIG. 1A, the current flow path of the thermopile 10 extends in series from a thermoelectric layer of one conductivity type to a thermoelectric layer of the opposite conductivity type. It is to be realized that as said conventional-electrical current flows from a thermoelectrically N-type material to a thermoelectrically P-type material, a cooling effect is imparted to the material between the thermoelectric layers. Similarly as conventional current flows from thermoelectrically P-type material to thermoelectrically N-type material, a heating effect takes place therebetween. In the arrangement illustrated herein, the direction of current flow and the polarity of the thermoelectric layers are chosen for the illustrative purposes of this specification, such that thermoelectric heating is imparted to each of the block members 30 and 32 while thermoelectric cooling is imparted to each of the heat exchange structures 16, 18, 20 and 22 respectively. It is to be realized that an opposite effect may take place by merely reversing the polarity of the direct current flow through the thermopile 10 or by reversing the conductivity type of the thermoelectric layers throughout the thermopile 10, whereby thermoelectric cooling in each of the block members 30 or 32 will result and thermoelectric heating of each of the heat exchange structures 16, 18, 20 and 22 will occur.

It will be further appreciated that the thermopile 10 can also act as a thermoelectric generator by merely supplying relatively cool fluid to one of the heat exchange means such as to the heat exchange structures 16, 18, 20 and 22 and relatively warm fluid to the remaining heat exchange structure such as the flow passageways 58. In this manner electrical current will be produced at each of the thermoelectric junctions in the thermopile 10 thereby providing electrical power across each of the terminal structures 42.

Figure 2:
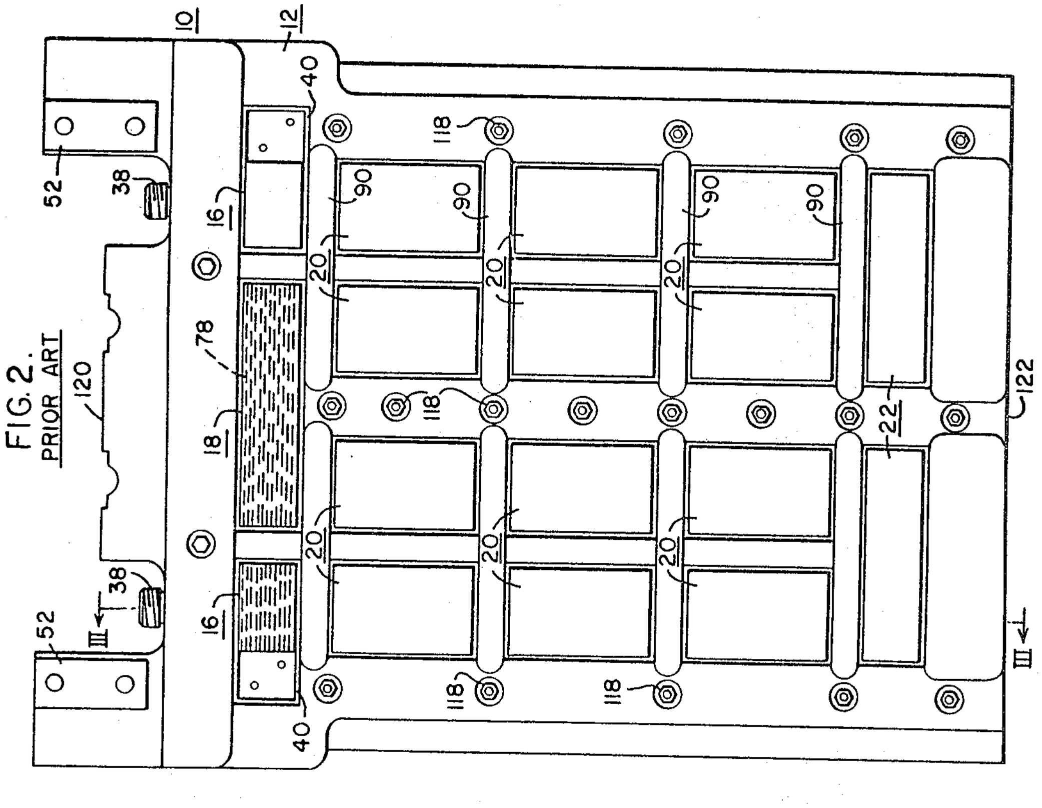
FIG. 2. PRIOR ART
FIG. 2 is a bottom plan view of the thermoelectric construction of FIGS. 1A and 1B.

Each of the heat exchange structures 16, 18, 20 and 22 are formed (as seen in FIGS. 2 and 3) to include a base member referred to by the reference character 70 for each of the heat exchange structures 16, 18, 20 and 22. Each of the base members 70 are secured to the thermoelectric layers 26 and 28 with each base 70 being formed from electrically conductive material to form an electrical bridge across the thermoelectric layers that are secured thereto.

Extending laterally from each of the base members 70 in a generally U-shaped frame for example the frame 72 of the lower left-hand heat exchange structure 20 of FIG. 3 with the frame 72 having its legs 74 extending laterally from the horizontally extending edges of the base 70 and bridged by a member 76 which extends parallel to the base 70. Extending laterally between the member 76 and base 70 in a horizontal direction as viewed in FIGS. 2 and 3 are a plurality of spaced fins 78 which are formed from thermally conductive material and which serve to enlarge the heat exchange area of each of the heat exchange structures 16, 18, 20 and 22. The fins 78 are also illustrated in dotted lines in FIG. 2 and extend transversely across the thermopile 10 when the latter is assembled.

In the construction of thermopiles such as the arrangement 10 of this invention, it is desirable to maintain a hermetically sealed liquid flow passage arrangement for the thermopile 10. In furtherance of this purpose, a hermetic joint is made between each of the bellows 34 and the adjacent flanges 56 of adjacent block members 30. It is important to maintain the integrity of each of the latter hermetic joints. As a result it has been determined that the effects of an ambient atmosphere containing substantial moisture may be detrimental to the hermetic joints between the block members 30 and bellows 34. It is therefore desirable to isolate the ambient atmosphere adjacent each of the bellows 34 to minimize the amount of moisture in the ambient atmosphere.

It will be apreciated that the air flowing through each of the heat exchange structures 16, 18, 20 and 22 contains therein moisture, which moisture adversely affects not only the joints between block members 30 and 32 and bellows 34, but also the joints between the block members 30 and 32, heat exchangers 16, 18, 20 and 22 and the thermoelectric pellets 26 and 28. In accordance with the invention, means are provided to isolate the atmosphere adjacent each of the bellows 34 and each pellet 26 and 28 from the air flowing through the heat exchange structures 16, 18, 20 and 22. Such means also provide a shockproof arrangement permitting the use of the thermopile 10 and apparatus which may be from time to time subjected to severe shock.

The last mentioned means comprises each of the grid structures 12 and 14 with the grid structure 14 having a plurality of openings 80 therein both positioned and shaped to receive therein the upper layer of heat exchange structures 20. Each of the openings 80 corresponds in size to the periphery of each of the heat exchange structures 20, and is formed with a shoulder 82 thereon which is positioned to engage a flanged portion 84 located at the periphery of each of the heat exchange structures 20 adjacent the base 70 thereof. The U-shaped structure 72 and fins 78 of each of the heat exchange structures 20 extend outwardly through the openings 80 so that each of the bellows 34 and block members 30 and 32 are positioned beneath the lower side 86 of the grid structure 14. During operation of the thermopile 10, a suitable gaseous medium, for example air, is passed into intimate contact with each of the heat exchange structures of the thermopile 10 and through the openings between spaced fins 78 thereof. Means are provided for preventing the air flow, which normally contains moisture therein, from communicating with the bellows 34. Such means comprise the gasketing means 36 of FIG. 1A which are generally of a picture frame construction having an L-shaped cross section and which are interposed between the heat exchange structures 20 and the grid structures 14. More particularly, lock gasketing means 36 is positioned between the shoulder 82 and the flange 84 formed on base 70. The gasketing means 36 desirably is formed from a resilient material so that each of the gaskets 36 is mounted in compression thereby preventing the passage of air therethrough into engagement with the block members 30 and 32, pellets 26 and 28 and bellows 34. The lower frame 14 is provided with a plurality of laterally extending guide means 90 formed integrally thereon and disposed between adjacent ones of the heat exchange structures 20 with the guide means 90 extending parallelly with the fins 78. Each of the guide means 90 extends outwardly from the frame 14 in an amount equal to the outward extent of the frame 72 of the heat exchange structures 20. As seen in FIG. 3, the outward ends of each heat exchange structure 20 and the guide means 90 are substantially coplanar. The frame 14 is provided at its upward end with an outwardly extending transverse projection 92 which extends outwardly therefrom an amount equal to the corresponding extent of the guide means 90. Similarly, at the lower end of the frame 14, a pair of guide means 94 of relatively heavier construction are positioned to extend outwardly in an amount corresponding to the outward extent of the guide means 90 and 92. With the guide means 90, each of the heat exchange structures 20 are nested closely between adjacent guide means of the frame 14 so that flow passageways through the heat exchange structures 20 are formed by the frame 14 with the gas being cooled passing laterally across the frame 14.

The other side of the thermopile 10 is enclosed by a similar grid 12 with the grid 12 having a plurality of openings 96 therein which receive the heat exchange structures 20 of the upper group of heat exchange structures on shoulders 98, corresponding to the shoulders 82 of openings 80 in frame 14. Each of the heat exchange structures 20 also having the outward peripheral flange 84 extending outwardly from the bases 70 thereof, respectively, so that when each heat exchange structure 20 in the upper layer is disposed in its opening 96 of the upper grid 12, the corresponding gasket means 97 of the lower group of gaskets 24 are positioned in compression between the shoulders 98 and the peripheral flange 84. In the grid frame 12 there are provided twelve openings 96 for receiving the twelve heat exchange structures 20 of the lower group. In addition, there are provided two openings 100 which are sized to receive the two heat exchange structures 16, together with the extensions 40 thereof. The heat exchange structures 16 are positioned in the openings 100 in the same manner as the heat exchange structures 20 are positioned within the openings 96. In furtherance of this purpose a specially shaped gasketing means 102 are interposed between each of the heat exchange structures 16 and the shoulders formed adjacent the periphery of the openings 100 in grid 12. Similarly the grid structure 18 is positioned in a correspondingly shaped opening 104 in the grid 12 with a gasket 106 interposed between heat exchange structure 18 and the peripheral shoulder of opening 104. Each of the bridging heat exchange structures 22 are provided with peripheral gaskets 108 which are positioned in engagement with shoulders 110 formed in openings 112 in grid 12.

Assembly of the thermopile 10 is achieved by clamping the grids 12 and 14 together to form a generally sandwiched mounting of the modules 30 and 32. In furtherance of this purpose, each of the grids 12 and 14 is provided with aligned openings 114 and 116 therein respectively through which mounting bolts 118 having resilient washers 120 are passed with the bolts 118 being threadedly secured to appropriate nuts 122 with resilient washers 124 clamped between the nuts 122 and the frame 12. Each of the mounting bolts 118 is tightened to a degree sufficient to compress each of the gasketing means 36, 24, 102, 106 and 108 and each of the resilient washers 120 and 124 to prevent the passage of air between the heat exchange structures and the grids 12 and 14 adjacent the mounting bolts 18, respectively.

Inasmuch as each of the longitudinal sides of the grids 12 and 14 are spaced apart, a pair of longitudinally extending deflecting means 126 are secured along the longitudinal sides of the grids 12 and 14 to prevent the flow of air into the region occupied by the modules 30 and 32 and bellows 34. Each of the deflectors 126 form with a generally semicircular cross section so that the longitudinal edges thereof are secured in a hermetic manner to the longitudinal sides of the grids 12 and 14 and to provide further a path creating a smooth flow of air toward the heat exchange means 16, 18, 20 and 22.

In this example of the invention, it is contemplated that air flow into the heat exchanger will move only in a direction parallel to fins 78. As a result there are provided no means for sealingly enclosing the upper and lower ends of thermopile 10. If desired, gasketing means may be interposed between grids 12 and 14 adjacent ends 120 and 122 thereof, and about the entire outer periphery of grids 12 and 14.

It will be appreciated that the grids 12 and 14 fixedly position each of the heat exchange structures 16, 18, 20 and 22 relative to one another. Inasmuch as each of the block members 30 and 32 are secured to two of the heat exchange structures through a pair of thermoelectric layers, the grids 12 and 14 also serve to fixedly position the block members 30 and 32. Each of the connectors or bellows are formed to absorb therein any changes in the spacing between block members 30 and/or 32 to which such bellows 34 are secured. Such spacing changes occur because of thermal expansion and contraction of the block members 30 and 32 arising during transient operation of the thermopile 10. Thus, the thermopile 10 results in a construction which is resistant to thermal shock while still retaining a substantial resistance to shock caused by impact forces.

In this example of the invention, each of the grids 12 and 14 are desirably formed from a lightweight insulating material, for example from a polyester glass composition. It is to be realized however, that the grids 12 and 14 may be formed from an electrically conductive material and that the aforedescribed construction of the thermopile 10 may still be utilized therewith inasmuch as insulating means such as the gaskets 24, 36, 102, 106 and 108 are interposed between each of the heat exchange structures 20, 16, 18 and 22, respectively to preserve the integrity of the desired electrical flow path through the thermopile 10. In addition, as shown in FIGS. 2 and 3, each of the heat exchange structures is spaced from the grids 12 and 14 to prevent electrical short circuiting. It will be realized, however, that should the grids 12 and 14 be formed from electrically conductive material, a different mounting arrangement for the terminals 42 will be necessary.

Each of the heat conductive blocks 30 and 32 and the inlet and outlet conduits 38 are formed from a suitable electrically conductive and heat conductive material, for example from copper or aluminum. The thermoelectric pellets 28 and 26 may be formed from any suitable thermoelectric material such as bismuth telluride, and the heat exchange structures 16, 18, 20 and 22 desirably are formed from a material having good thermal and electrical conductivity properties for example from copper or aluminum. The connectors or bellows 34 desirably are formed from a material metallurgically compatible with the material forming the blocks 30, 32 and 38 to effect a good hermetic joint therebetween, for example from certain stainless steels, titanium alloys or from nickel chromium iron alloys, sold commercially under the names Inconel and Inconel-X. The gaskets 36, 97, 102, 106 and 108 and washers 120 and 124 are formed desirably from a resilient insulating material, for example from molded rubber and the flow directing means 126 may be formed from any material which can be suitably secured to the grids 12 and 14, for example from the same material forming the grids 12 and 14.

For optimum operation and maximized coefficient of performance the ratio of the area of the pellets 26 and 28 to the length or thickness thereof must decrease with the increase in the difference in temperature ($\Delta t_p$) through the pellets. For that reason the pellets 26 and 28 are varied as to size of area and/or length along the path of flow of the air to be cooled.

Figure 4:
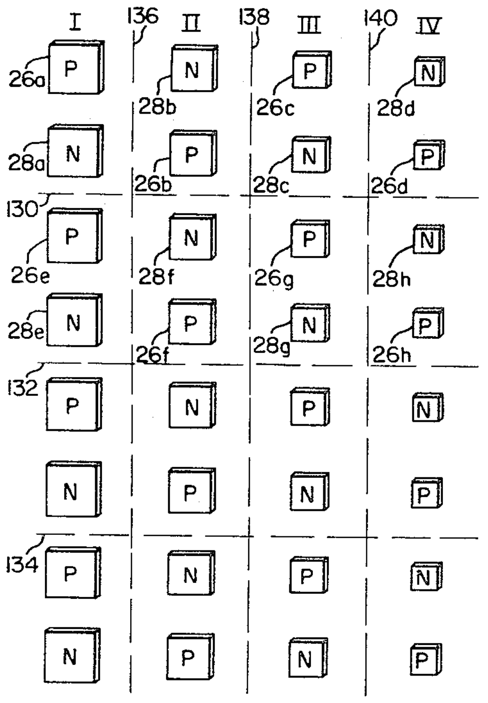
FIGS. 4, 5 and 6 are diagrammatic views embodying improvements over the prior art structure in accordance with this invention.
Figure 5:
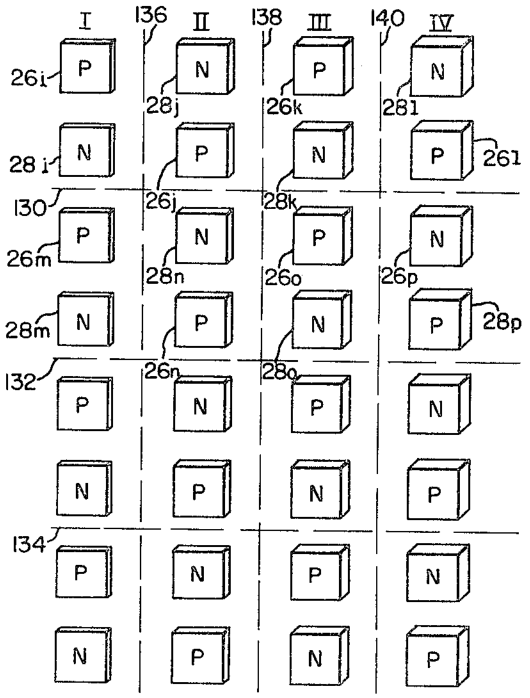
Figure 6:
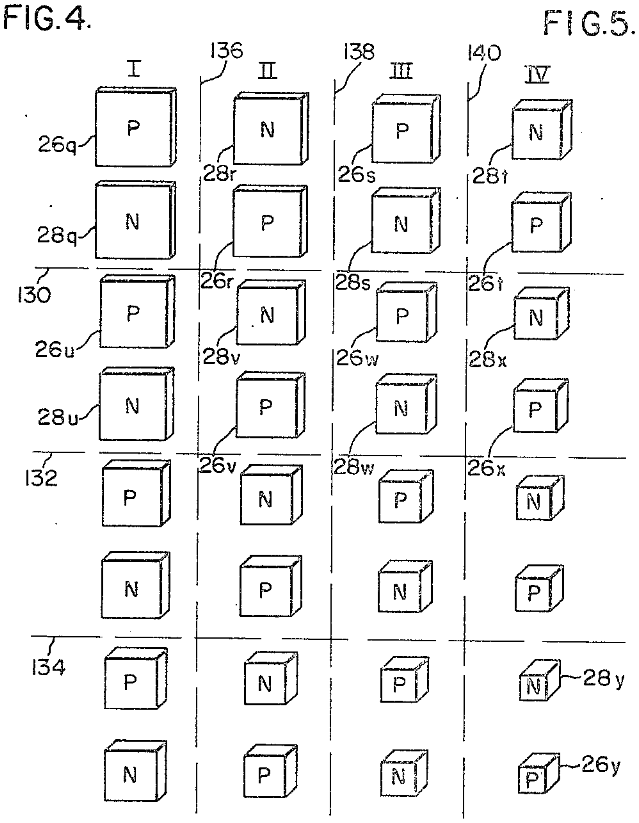

In FIGS. 4, 5 and 6 the pellets are disposed in an array similar to the pellets 26 and 28 in FIGS. 1A and 1B. For illustration the pellets in FIGS. 4, 5 and 6 are divided into four horizontal levels 130, 132 and 134, and into four vertical stages I, II, III and IV by vertical lines 136, 138 and 140. As shown in FIG. 4, the pellets **26*a* and 28*a* have a maximum area; pellets 26*b* and 28*b* have a smaller area; and pellets 26*c* and 28*c* have an even smaller area. The pellets 26*d* and 28*d* are of smallest area. All of the pellets 26*a* and 28*a* through 26*d* and 28*d* have the same length or thickness. In a similar manner the pellets 26 and 28 between the lines 130 and 132 are of similar configuration. For example, the particular pellets 26*e* and 28*e* have the same area (and length) as the pellets 26*a* and 28*a*, respectively. Likewise, the pellets 26*f*, 28*f*, 28*g*, 26*g*, 26*h*, and 28*h* correspond to the pellets 26*b*, 28*b*, 26*c*, 28*c*, 26*d*, and 28*d*, respectively, as to area and length. The pellets 26 and 28 in the lower levels between lines 132 and 134 and below line 134** correspond in area and length with the particular pellets directly above with regard to area and length. That is, all pellets in the same stage I, II, III or IV have corresponding areas and length. As a result, the ratio of area to length decreases along the path of movement of the air which enters the thermopile at the left edge, where the pellets in stage I are located, and extends horizontally to the outlet end, where the pellets in stage IV are disposed.

The area to length ratio may also be decreased along the path of flow of the air by maintaining a constant area for each pellet and enlarging the length or thickness. In FIG. 5 all of the pellets have the same area, however, the length or thickness of the pellets increase in each successive stage from **26*i* and 28*i* to 26*l* and 28*l*. In a similar manner, the pellets in any other level, such as the level between the lines 130 and 132, increase in length or thickness from 26*m* and 28*m* to 26*p* and 28*p***. Thus, all of the pellets in stage I are of the shortest length, and the pellets in the stage IV are of the longest length. The pellets in stage II have a length slightly greater than the pellets in stage I. The pellets in stage III have a length slightly greater than that of the pellets in stage II. Accordingly, the ratio of area to length of pellets decreases with increasing difference in temperature through the pellets.

The ratio of area to length of pellet may be changed in another manner as shown in the embodiment in FIG. 6 in which the area is decreased horizontally and vertically and the length of the pellets is increased horizontally and vertically. As shown in FIG. 5, particular pellets **26*q* and 28*q* in the upper level of stage I have greater area and a shorter length than the area and length of pellets 26*r* and 28*r* in the next adjacent stage II. Likewise, the pellets 26*s* and 28*s* in stage III have a greater area and shorter length than those in the same layer in stage II, but have a greater area and shorter length than the pellets 26*t* and 28*t* in stage IV. In the lower levels below lines 130, 132 and 134 the pellets have a similar area and length relationship. For example, the pellets 26*u* and 28*u* have a greater area and shorter length than those of pellets 26*v* and 28*v*, which have a greater area and shorter length than those of pellets 26*w* and 28*w*, which have a greater area and shorter length than those of pellets 26*x* and 28*x*. However, the area of the pellets in each stage, such as stage I, decreases in each successively lower level. Thus, pellets 26*y* and 28*y* in the lowermost level have the smallest area and greatest length of all pellets 26 and 28** in the assembly.

The particular pattern of pellets 26 and 28 will have parameters for a given area and length which are dictated by the pattern of the temperature difference through the pellets which in turn is partly dictated by the direction in which the coolant water flows through the block members or modules 30. Accordingly, the directions of flow of the air to be cooled and the coolant water are primary factors in controlling the temperature differences through the several pellets 26 and 28 along the path of flow of the cooled air.

It is understood that although an air to water thermopile 10 is disclosed the same principles would apply to a thermopile used for liquid-to-liquid, or for air-to-air constructions. Moreover, although a device for cooling a fluid has been described, it will be appreciated that the device may be used for heating applications by merely reversing the direction of flow of both fluids. Under such conditions the *A/L* ratio will increase with each successive layer.

Various modifications may be made in the example of the invention described herein without departing from the broad spirit and scope of this invention. Accordingly, it is specifically intended that the above described be interpreted as illustrative of the invention rather than as in limitation thereof.

What is claimed is:

1. In a thermoelectric device, a first conduit for conveying one fluid, a second conduit for conveying another fluid the conduits being disposed substantially parallel and in proximity to each other throughout substantially their lengths such that a space is present therebetween, a plurality of thermoelectric elements each comprising wafers of thermoelectric material disposed in said space and having their opposite faces in thermal contact with both of the conduits, the area and length of the thermoelectric wafers progressively varying from one end of the conduits to the other end, and means for passing electrical current through the thermoelectric elements for heating one face of the elements and for cooling the other face so as to provide for maximum efficiency of heating the fluid in one conduit and cooling the fluid in the other conduit as the temperatures of each of the fluids change in flowing through their respective conduits.

2. The device of claim 1 in which the ratio of area to length of wafers of thermoelectric material decreases along the path of flow of the coolant fluid as the temperature difference across the wafers increase.

3. A thermoelectric heat exchanger comprising a plurality of coplanar rows of spaced first fluid conveying conduits formed of thermally and electrically conductive material, means forming a predetermined first fluid flow path through said first conduits, a plurality of second fluid-conveying conduits composed of thermally and electrically conductive material the said second conduits being disposed in coplanar rows on opposite sides of and spaced from the coplanar rows of the first conduits, each second conduit forming a portion of at least a second fluid flow path for said heat exchanger and having a base side facing the first conduits, a layer of thermoelectric material in the space between each first conduit and the juxtaposed ones of said second conduits, the thermoelectric material having opposite side surfaces and a length dimension therebetween, one of which surfaces of each layer being secured to an adjacent first conduit and the other of which surfaces being secured to the base side of an adjacent second conduit, means including the base side and forming at least a part of an electrically conductive path between the thermoelectric layers and through the first conduits, and the ratio of the area of the side surface to the length dimension of each layer along at least one of said first and second flow paths varying with each successive layer along the latter flow path.

4. The thermoelectric heat exchanger of claim 3 in which the temperature difference increases through successive layers along one of the flow paths.

5. The thermoelectric heat exchanger of claim 3 in which said one and said second flow paths extend substantially perpendicular to each other.

6. The thermoelectric heat exchanger of claim 3 in which the length dimensions of the layers along said one of said first and second flow paths are equal and the areas of the side surface decrease with each successive layer along said one flow path.

7. The thermoelectric heat exchanger of claim 3 in which the areas of the side surfaces of the layers along said one of said first and second flow paths are equal and the length dimensions increase with each successive layer along said one flow path.

8. The thermoelectric heat exchanger of claim 3 in which the areas of the side surfaces and the length dimensions vary with each successive layer in such a manner that the ratio of the area to length decreases.

9. The thermoelectric heat exchanger of claim 3 wherein said second flow path is formed to conduct fluid in a direction lateral to said rows and successively past each of said rows, said layers of thermoelectric material engaging those of said first conduits located in each of said rows, each layer having the same ratio of side surface area to length dimension as the remainder of layers in each row respectively, and said ratio successively decreasing for those layers engaging the first conduits of successive rows along said second flow path.

10. The thermoelectric heat exchanger of claim 3 wherein said second flow path is formed to conduct fluid in a direction lateral to said rows and successively past each of said rows, said layers of thermoelectric material engaging those of said first conduits located in each of said rows, each layer having the same ratio of side surface area to length dimension as the remainder of layers in each row respectively, and said ratio successively increasing for those layers engaging the first conduits of successive rows along said second flow path.

11. The thermoelectric heat exchanger of claim 9 wherein the first conduits are formed to conduct a liquid therethrough, and the second conduits are formed to conduct a gas therethrough.

References Cited

UNITED STATES PATENTS

| | | | |
|---|---|---|---|
| 3,125,860 | 3/1964 | Reich | 62—3 |
| 3,209,433 | 10/1965 | Meyer et al. | 62—3 |

WILLIAM J. WYE, *Primary Examiner.*